US010715946B2

(12) United States Patent
Lee et al.

(10) Patent No.: US 10,715,946 B2
(45) Date of Patent: Jul. 14, 2020

(54) SYSTEM AND A PROCESSING METHOD FOR CUSTOMIZING AUDIO EXPERIENCE

(71) Applicant: Creative Technology Ltd, Singapore (SG)

(72) Inventors: Teck Chee Lee, Singapore (SG); Christopher Hummersone, Surrey (GB); Toh Onn Desmond Hll, Singapore (SG)

(73) Assignee: Creative Technology Ltd, Singapore (SG)

(*) Notice: Subject to any disclaimer, the term of this patent is extended or adjusted under 35 U.S.C. 154(b) by 0 days.

(21) Appl. No.: 16/279,929

(22) Filed: Feb. 19, 2019

(65) Prior Publication Data

US 2019/0215641 A1 Jul. 11, 2019

Related U.S. Application Data

(63) Continuation of application No. 15/969,767, filed on May 2, 2018, now Pat. No. 10,225,682.

(30) Foreign Application Priority Data

Jan. 5, 2018 (SG) .......................... 10201800147X

(51) Int. Cl.
*H04S 7/00* (2006.01)
*G06K 9/00* (2006.01)
(Continued)

(52) U.S. Cl.
CPC ............ *H04S 7/305* (2013.01); *G06F 16/636* (2019.01); *G06K 9/00369* (2013.01);
(Continued)

(58) Field of Classification Search
CPC . H04S 7/305; H04S 7/301; H04S 7/40; H04S 2420/01; G06K 9/00885;
(Continued)

(56) References Cited

U.S. PATENT DOCUMENTS 7,840,019 B2 11/2010 Slaney et al.
7,936,887 B2 5/2011 Smyth
(Continued)

FOREIGN PATENT DOCUMENTS

FR 3051951 B1 6/2018
WO 2017041922 A1 3/2017
WO 2017/202634 A1 11/2017

OTHER PUBLICATIONS

John C. Middlebrooks, "Virtual localization improved by scaling nonindividualized external-ear transfer functions in frequency," Journal of the Acoustical Society of America, Sep. 1999, pp. 1493-1510, vol. 106, No. 3, Pt. 1, USA.
(Continued)

*Primary Examiner* — Yogeshkumar Patel
(74) *Attorney, Agent, or Firm* — Russell Swerdon; Desmund Gean

(57) ABSTRACT

The present disclosure relates to a system and a processing method in association with the system for customizing audio experience. Customization of audio experience can be based on derivation of at least one customized audio response characteristic which can be applied to an audio device used by a person. The customized audio response characteristic(s) can be unique to the person.

20 Claims, 3 Drawing Sheets

(51) Int. Cl.
  *H04R 5/04*  (2006.01)
  *G06F 16/635* (2019.01)
(52) U.S. Cl.
  CPC .......... *G06K 9/00885* (2013.01); *H04R 5/04*
    (2013.01); *H04S 7/301* (2013.01); *H04S 7/40*
    (2013.01); *H04S 2420/01* (2013.01)
(58) Field of Classification Search
  CPC .... G06K 9/00369; G06F 16/636; H04R 5/04;
           H04R 3/00; H04R 5/033
  See application file for complete search history.

(56) References Cited

U.S. PATENT DOCUMENTS

| | | | |
|---|---|---|---|
| 9,030,545 | B2 | 5/2015 | Pedersen |
| 9,544,706 | B1 | 1/2017 | Hirst |
| 9,602,947 | B2 | 3/2017 | Oh et al. |
| 2006/0067548 | A1* | 3/2006 | Slaney .................. H04S 1/002 381/303 |
| 2007/0270988 | A1 | 11/2007 | Goldstein et al. |
| 2008/0170703 | A1 | 7/2008 | Zivney |
| 2012/0008806 | A1 | 1/2012 | Hess |
| 2012/0183161 | A1 | 7/2012 | Agevik et al. |
| 2013/0169779 | A1* | 7/2013 | Pedersen ................. G06K 9/64 348/77 |
| 2015/0073262 | A1 | 3/2015 | Roth et al. |
| 2015/0124975 | A1 | 5/2015 | Pontoppidan |
| 2015/0312694 | A1 | 10/2015 | Bilinski et al. |
| 2015/0373477 | A1 | 12/2015 | Norris et al. |
| 2015/0382127 | A1 | 12/2015 | Sun et al. |
| 2016/0227338 | A1* | 8/2016 | Oh .......................... H04S 7/303 |
| 2016/0379041 | A1 | 12/2016 | Rhee et al. |
| 2018/0091920 | A1 | 3/2018 | Family |
| 2018/0218507 | A1 | 8/2018 | Hyllus et al. |
| 2018/0249275 | A1* | 8/2018 | Ghorbal ................. H04S 7/301 |
| 2018/0249279 | A1 | 8/2018 | Karapetyan et al. |

OTHER PUBLICATIONS

Yukio Iwaya, "Individualization of head-related transfer functions with tournament-style listening test: Listening with other's ears," Acoustical Science and Technology, 2006, vol. 27, Issue 6, Japan.

Slim Ghorbal, Theo Auclair, Catherine Soladie, & Renaud Seguier, "Pinna Morphological Parameters Influencing HRTF Sets," Proceedings of the 20th International Conference on Digital Audio Effects (DAFx-17), Sep. 5-9, 2017, Edinburgh, UK.

Slim Ghorbal, Renaud Seguier, & Xavier Bonjour, "Process of HRTF individualization by 3D statistical ear model," Audio Engineering Society's 141st Convention e-Brief 283, Sep. 29, 2016-Oct. 2, 2016, Los Angeles, CA.

Robert P. Tame, Daniele Barchiesi, & Anssi Klapuri, "Headphone Virtualisation: Improved Localisation and Externalisation of Non-individualised HRTFs by Cluster Analysis," Audio Engineering Society's 133rd Convention Paper, Oct. 26-29, 2012, San Francisco, CA.

Meshram et al., "P-HRTF: Efficient Personalized HRTF Computation for High-Fidelity Spatial Sound," 2014 IEEE International Symposium on Mixed and Augmented Reality (ISMAR), 2014, pp. 53-61, Munich, Germany.

Dalena, Marco. "Selection of Head-Related Transfer Function through Ear Contour Matching for Personalized Binaural Rendering," Politecnico Di Milano Master thesis for Master of Science in Computer Engineering, 2013, Milano, Italy.

Cootes et al., "Active Shape Models—Their Training and Application," Computer Vision and Image Understanding, Jan. 1995, pp. 38-59, vol. 61, No. 1, Manchester, England.

Zotkin, Dmitry et al., HRTF Personalization Using Anthropometric Measurements, 2003 IEEE Workshop on Applications of Signal Processing to Audio and Acoustics, Oct. 19-22, 2003, p. 157-160, New Paltz, NY.

Karapetyan et al., Elevation Control in Binaural Rendering, Jun. 4-7, 2016, pp. 1-4, Audio Engineering Society, 140th Convention e-Brief 270, Paris, France.

\* cited by examiner

SYSTEM AND A PROCESSING METHOD FOR CUSTOMIZING AUDIO EXPERIENCE

CROSS-REFERENCE TO RELATED APPLICATION

This application is a continuation of U.S. patent application Ser. No. 15/969,767, filed 2 May 2018 and entitled "SYSTEM AND A PROCESSING METHOD FOR CUSTOMIZING AUDIO EXPERIENCE", which claims the benefit of priority from Singapore Patent Application No. 10201800147X, filed 5 Jan. 2018 and entitled "A SYSTEM AND A PROCESSING METHOD FOR CUSTOMIZING AUDIO EXPERIENCE", the entirety of which are incorporated by reference for all purposes.

FIELD OF INVENTION

The present disclosure generally relates to a system and a processing method for customizing audio experience.

BACKGROUND

In general, it is desirable to provide an audio experience suited for individuals. However, it is acknowledged that there may be difficulties in achieving this.

Fundamentally, a person's head is unique. Therefore, the manner audio signals can be perceived by an individual will vary. This can be commonly characterized, under anechoic conditions, based on head related impulse response (HRIR)/ head related transfer function (HRTF).

Moreover, the need to consider how audio signals travel in a given environment (e.g., a room) and reach a person can further complicate matters. Travel of audio signals in a room can be commonly characterized based on binaural room impulse response (BRIR)/binaural room transfer function (BRTF).

Current solutions to customize audio experience for an individual involve, in one example, the approach of matching the subject individual's image (e.g., photograph of the individual) with a BRIR/BRTF database or a HRIR/HRTF database to obtain a BRIR/BRTF/HRIR/HRTF which best matches the subject individual (i.e., typically based on similarity between the subject individual's image and a corresponding image associated with the BRIR/BRTF/ HRIR/HRTF).

The present disclosure contemplates that the abovementioned approach is not ideal.

Therefore, the present disclosure contemplates that there is therefore a need for a solution which improves, at least in part, current solutions for customizing audio experience/a solution which provides a different/improved approach for customizing audio experience.

SUMMARY OF THE INVENTION

In accordance with an aspect of the disclosure, there is provided a processing method.

The processing method can include processing at least one captured image of a subject to generate at least one input signal. The capture image can be processed at a processing apparatus to generate the input signal(s).

The processing method can further include processing the generated input signal(s) based on at least one database signal to generate a plurality of intermediate processor datasets. The database signal(s) can be communicated from at least one database to the processing apparatus.

The processing method can yet further include combining the plurality of intermediate processor datasets to produce at least one output signal.

The output signal(s) can correspond to an audio response characteristic unique to the subject. Preferably, the output signal(s) can be applied to input audio signals to generate output audio signals audibly perceivable by the subject so as to provide the subject with customized audio experience.

In accordance with another aspect of the disclosure, there is provided a processing apparatus.

The processing apparatus can be configured to be communicable with at least one database containing at least one dataset corresponding to an audio response characteristic based on biometric data from at least one person. At least one dataset from the database can be communicated as corresponding at least one database signal to the processing apparatus.

Additionally, the processing apparatus can be operated in at least one processing mode of a plurality of processing modes. Each processing mode can correspond to a recognizer type.

Moreover, the processing apparatus can be configured to receive an image of a subject and generate at least one input signal based on the received image. The processing apparatus can be further configured to process the input signal based on the database signal to generate at least one output signal. The processing apparatus can yet be further configured to process the input signal based on the database signal to generate a plurality of intermediate processor datasets. The intermediate processor datasets can be combined to generate the output signal(s).

The output signal(s) can correspond to an audio response characteristic unique to the subject and can be applied to input audio signals to generate output audio signals audibly perceivable by the subject so as to provide the subject with customized audio experience.

BRIEF DESCRIPTION OF THE DRAWINGS

Embodiments of the disclosure are described hereinafter with reference to the following drawings, in which.

DETAILED DESCRIPTION

The present disclosure relates to a system (and a processing method in association with the system) for customizing audio experience. Customization of audio experience can be based on derivation of at least one customized audio response characteristic which can be applied to an audio device used by a person. At the audio device, input audio signals can be processed based on the customized audio response characteristic to produce output audio signals which can be audibly perceived by the person. In this regard, the system, and processing method in association therewith, can be operated to customize audio experience for a person by manner of deriving/generating at least one customized audio response characteristic which can be unique to the person.

Audio response characteristic can be associated with audio related transfer function. Audio related transfer function can relate to, for example, head related impulse response (HRIR) and/or binaural room impulse response (BRIR). In a specific example, audio related transfer function can be based on head related transfer function (HRTF) and/or binaural room transfer function (BRTF) which can be derived based on suitable transformation (e.g., Fourier transformation) of respective HRIR and/or BRIR.

These will be discussed in further detail with reference to FIG. 1 to FIG. 4 hereinafter.

Figure 1:
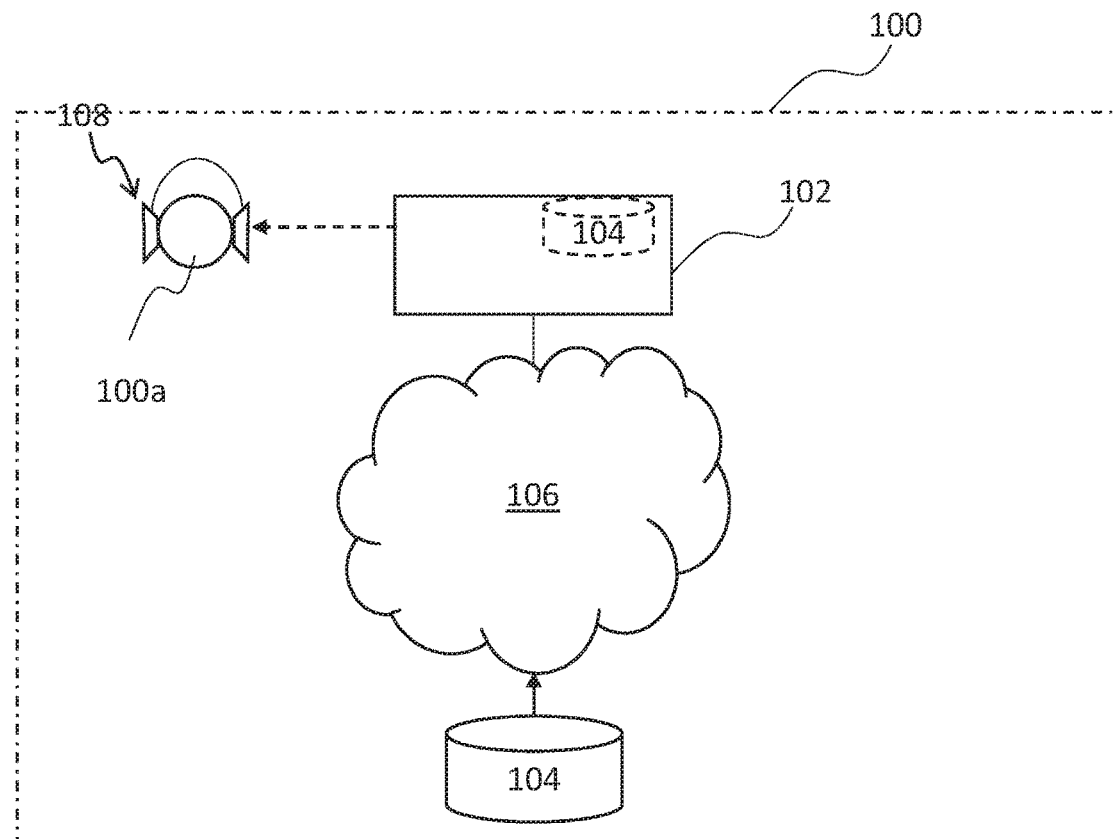
FIG. 1 shows a system operable for customizing audio experience and which includes a processing apparatus, according to an embodiment of the disclosure.

Referring to FIG. 1, a system 100 is shown, according to an embodiment of the disclosure. Specifically, the system 100 can be operable for customizing audio experience. More specifically, the system 100 can be operable for customizing audio experience for a person 100a.

The system 100 can include a processing apparatus 102, one or more database(s) 104 and a communication network 106. The system 100 can further include an audio device 108. The audio device 108 can be used by the person 100a to experience audio signals.

The processing apparatus 102 can, for example, correspond to a computer (e.g., a desktop computer, a Smartphone, an electronic tablet, a laptop computer, a media player or a combination of two or more of the aforementioned examples).

The one or more databases 104 can, for example, correspond to one or more HRIR based databases and/or one or more BRIR based databases (or, alternatively, corresponding one or more HRTF and/or BRTF based databases). In one example, the database(s) 104 can correspond to HRIR/HRTF database(s) containing HRIRs/HRTFs measured, extracted and/or parameterized in respect with individual subjects and/or different artificial head-and-torso simulators. In another example, the database(s) 104 can correspond to BRIR/BRTF database(s) containing BRIRs/BRTFs measured, extracted and/or parameterized in different types of rooms with various parameters such as source/receiver distances and/or azimuth angles considered. In yet another example, the subject individual's image can be matched with a database which may be storing the features or parameters of BRIRs/BRTFs/HRIRs/HRTFs (i.e., instead of the actual BRIRs/BRTFs/HRIRs/HRTFs).

The communication network 106 can, for example, correspond to an internet network or an intranet network.

The audio device 108 can, for example, correspond to a headset which can be worn by a person 100a for audio experience of audio signals. In one embodiment, the audio device 108 can include an audio source (not shown), an audio processor (not shown) and a pair of speaker drivers (not shown). The audio source can be coupled to the audio processor. The audio processor can be coupled to the pair of speaker drivers.

The processing apparatus 102 can be coupled to the database(s) 104. Moreover, the processing apparatus 102 can be coupled to the audio device 108. The processing apparatus 102 can be coupled to the database(s) 104 and the audio device 108 by manner of one or both of wired coupling and wireless coupling. In this regard, the processing apparatus 102 and the database(s) 104 can be configured to signal communicate with each other. Furthermore, the processing apparatus 102 and the audio device 108 can be configured to communicate with each other.

Moreover, the processing apparatus 102 can be one or both of directly coupled and indirectly coupled to the database(s) 104.

In one embodiment, one or more databases 104 can, for example, be carried by one or more host devices (e.g., one or more servers). The one or more databases 104 (i.e., carried by one or more host devices) can be coupled to communication network 106. Moreover, the processing apparatus 102 can be coupled to the communication network 106. In this regard, the processing apparatus 102 and the database(s) 104 can be considered to be indirectly coupled in that the processing apparatus 102 is coupled to the database(s) 104 via the communication network 106.

In another embodiment, one or more databases 104 can be carried by the processing apparatus 102. In this regard, the processing apparatus 102 and the database(s) 104 can be considered to be directly coupled.

In yet another embodiment, one or more databases 104 can be carried by one or more host device (e.g., one or more servers) and one or more databases 104 can be carried by the processing apparatus 102. The one or more databases 104 (carried by one or more host devices and/or the processing apparatus 102) can be coupled to the communication network 106. In this regard, one or more database(s) 104 can be directly coupled to the processing apparatus 102 whereas one or more other database(s) 104 can be indirectly coupled (i.e., via the communication network 106) to the processing apparatus 102.

In general, the processing apparatus 102 can be configured to capture one or more images of a person 100a and/or receive one or more captured images of a person 100a, and process the captured image(s) to generate at least one input signal. The processing apparatus 102 can be further configured to process the input signal(s) to generate at least one output signal.

The database(s) 104 can be associated with at least one database signal. A database signal can correspond to a dataset contained in the database(s) 104. A dataset can, in one example, correspond to the aforementioned HRIR/HRTF. In another example, a dataset can correspond to the aforementioned BRIR/BRTF.

In one embodiment, the processing apparatus 102 can be configured to process the input signal(s) based on database signal(s) communicable from the database(s) 104 to generate/produce output signal(s).

Generated output signal(s) can be communicated from the processing apparatus 102 for further processing. Specifically, output signal(s) can be communicated from the processing apparatus 102 to the audio device 108 for further processing. More specifically, one or more input audio signals at the audio device 108 can be processed based on the received output signal(s) to produce/generate one or more output audio signals.

Yet more specifically, at the audio device 108, input audio signals can be generated and communicated from the audio source to the audio processor. The audio processor can be configured based on the output signal(s) communicated from the processing apparatus 102. Specifically, the audio processor can be configured to process the input audio signals based on the output signal(s) to generate/produce output audio signals. Generated output audio signals can be communicated from the audio processor to the speaker drivers.

The output audio signal(s) can be output from the audio device 108 via the speaker drivers and can be audibly perceived by a person 100a wearing the audio device 108.

In one embodiment, a captured image of a person 100a can be processed to extract/determine input data associated with the person 100*a*. Input data associated with a person 100*a* can, for example, correspond to biometric data (one or more pinna features, distance associated with separation of the eyes etc.) associated with the person 100*a*. In this regard, the input signal(s) can correspond to biometric data associated with a person 100*a* and the output signal(s) can correspond to output data corresponding to audio response characteristic(s) (e.g., audio related transfer function) which can be unique to the person 100*a*. Therefore, the output signal(s) can be considered to be generated for facilitating the customization of audio perception experienced (i.e., audio experience) by the person 100*a*.

Generally, the present disclosure contemplates that audio experience can be customized for a person 100*a* by manner of deriving/generating at least one customized audio response characteristic (i.e., the output signal(s)) for a person 100*a*. By processing input audio signals based on the customized audio response characteristic(s) to generate output audio signals for audible perception by the person 100*a*, audio experience can be customized for the person 100*a*.

Image capture of a person 100*a*, processing of the captured image(s) to generate the input signal(s) and processing the input signal(s) to produce/generate the output signal(s) will be discussed in further details with reference to FIG. 2 hereinafter.

Figure 2:
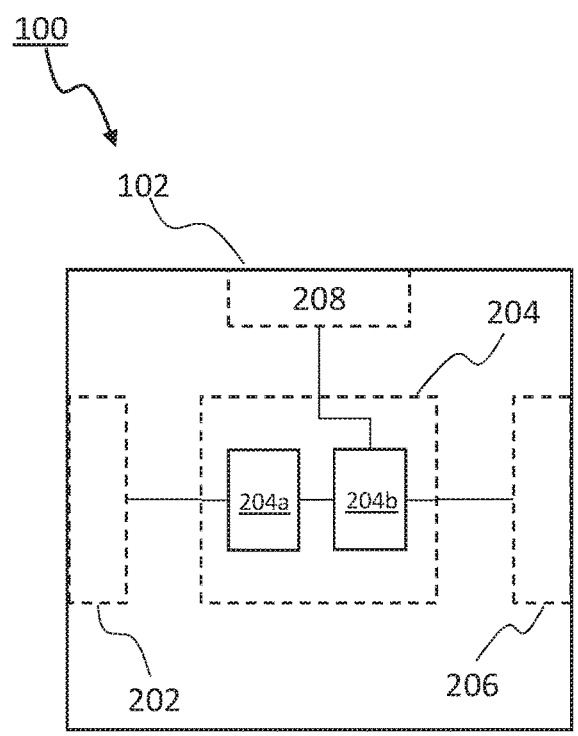
FIG. 2 shows the processing apparatus of FIG. 1 in further detail, according to an embodiment of the disclosure.

FIG. 2 shows the processing apparatus 102 in further detail, in accordance with an embodiment of the disclosure.

As shown, the processing apparatus 102 can include an input portion 202, a processing portion 204 and an output portion 206. The processing apparatus 102 can further include a transceiver portion 208. The input portion 202 can be coupled to the processing portion 204. The processing portion 204 can be coupled to the output portion 206. Additionally, the processing portion 204 can be coupled to the transceiver portion 208.

The input portion 202 can, in one embodiment, correspond to an image capturing device configured to be operable in a manner so as to capture one or more images of a person 100*a*. In another embodiment, the input portion 202 can correspond to a transceiver configured to receive one or more captured images of a person 100*a* from an input source (not shown). The input source can, for example, be a remote image capturing device which can be connected to the input portion 202 by manner of one or both of wired coupling and wireless coupling.

The processing portion 204 can, in one embodiment, correspond to a microprocessor and can include an image processing part 204*a* and a customization processing part 204*b*. The image processing part 204*a* can be coupled to the input portion 202. Moreover, the image processing part 204*a* can be coupled to the customization processing part 204*b*. The customization processing part 204*b* can be coupled to one or both of the output portion 206 and the transceiver portion 208.

The image processing part 204*a* can be configured to receive one or more captured images of a person 100*a* for further processing to produce/generate one or more input signals. As mentioned earlier, the input signal(s) can correspond to biometric data associated with a person 100*a*. In one embodiment, the image processing part 204*a* can be configured to receive a captured image and process the captured image via image processing techniques for automatic extraction of biometric data associated with a person 100*a*. The biometric data extracted can, in one example, be in relation to the pinna/auricle of a person's 100*a* ear. In another example, the biometric data extracted can be in relation to the head/shoulder of a person 100*a*. Input signals corresponding to extracted biometric data can be communicated from the image processing part 204*a* to the customization processing part 204*b*.

The customization processing part 204*b* can be configured to receive one or more input signals for further processing to produce/generate one or more output signals. The input signal(s) can be processed based on one or more processing strategies.

For example, the input signal(s) can be processed based on one or more of a first processing strategy, a second processing strategy and a third processing strategy, or any combination thereof.

In one embodiment, the input signal(s) can be processed based on any one of the first processing strategy, the second processing strategy and the third processing strategy. In another embodiment, the input signal(s) can be processed based on any combination of the first processing strategy, the second processing strategy and the third processing strategy.

The first processing strategy can, for example, correspond to a multiple-match processing based strategy.

In regard to the multiple-match processing based strategy, the present disclosure contemplates that biometric data extracted from a captured image can, in one embodiment, be communicated (e.g., via the transceiver portion 208) from the processing apparatus 102 to the database(s) 104 to identify and retrieve one or more datasets (e.g., HRIRs/HTRFs or BRIRs/BRTFs) matching the biometric data. Specifically, the processing apparatus 102 can be configured to identify and retrieve one or more datasets matching the biometric data Further, in regard to the multiple-match processing based strategy, the present disclosure contemplates that, in another embodiment, the processing apparatus 102 can be trained. As will be discussed later in further detail, training of the processing apparatus 102 can, for example, be based on one or both of the second processing strategy and the third processing strategy. Specifically the processing apparatus 102 can, for example, be trained (e.g., based on the second and/or third processing strategies) and one or more datasets (e.g., HRIRs/HTRFs or BRIRs/BRTFs) can be identified and retrieved by the trained processing apparatus 102 based on the biometric data.

The present disclosure further contemplates that the retrieved dataset(s) may not be considered to be a perfect match in relation to the biometric data.

Specifically, the present disclosure contemplates that each dataset retrieved can be associated with a certain degree of mismatch in relation to the biometric data. In this regard, the processing apparatus 102 can be configured (e.g., by manner of programming) to determine confidence level associated with each retrieved dataset in relation to the biometric data. Confidence level can be a measurement of an extent of match or mismatch of a retrieved dataset with reference to the biometric data. Therefore, confidence level can be considered a form closeness measure (i.e., extent of match or extent of mismatch) quantifying the extent of match/extent of mismatch between the retrieved dataset and the biometric data.

For example, based on the biometric data, a first dataset (i.e., a first BRIR), a second dataset (i.e., a second BRIR) and a third dataset (i.e., a third BRIR) can be retrieved. The first BRIR can be considered to be the closest match to the biometric data as compared with the second and third BRIRs. The second BRIR can be considered to be the next closest match to the biometric data followed by the third BRIR. Where a perfect match can be quantified with a confidence level of "1" and a total mismatch quantified with a confidence level of "0", the first to third BRIRs can, for example, be quantified with a confidence level of "0.8," "0.6" and "0.4" respectively.

Each of the datasets (e.g., a first BRIR, a second BRIR and a third BRIR) retrieved based on the multiple-match processing based strategy can be considered an intermediate processor dataset. For example, the first BRIR, the second BRIR and the third BRIR can be considered to correspond to a first intermediate processor dataset, a second intermediate processor dataset and a third intermediate processor dataset respectively.

In this regard, one or more intermediate processor datasets can be generated/derived based on the first processing strategy. The processing apparatus 102 can be configured, as will be discussed later in further detail, to further process the intermediate processor dataset(s) to generate/produce an output signal.

The second processing strategy can, for example, correspond to a multiple-recognizer based processing strategy.

In regard to the multiple-recognizer based processing strategy, the present disclosure contemplates that the processing apparatus 102 can be configured as a multiple recognizer. Specifically, the processing apparatus 102 can, by manner of training, be configured as a multiple recognizer. More specifically, the processing apparatus 102 can be trained to retrieve one or more datasets (e.g., one or more BRIRs) based on a plurality of training parameters.

The plurality of training parameters can, for example, be based on feature type associated with biometric data (i.e., biometric data feature type). Specifically, the plurality of training parameters can be based on a plurality of feature types associated with biometric data. Images of one or more than one person can be captured for each feature type associated with biometric data.

Examples of biometric data, as discussed earlier, can include pinna feature(s) and distance associated with separation of the eyes (i.e., eyes separation). A further example of biometric data can include size of the person's 100a head (i.e., head radius). Moreover, pinna feature can, for example, be related to size of the pinna (i.e., pinna radius).

In this regard, head radius can be considered to be an example of a first biometric data feature type and pinna radius can be considered to be an example of a second biometric data feature type. Moreover, eyes separation can be considered to be an example of a third biometric data feature type.

Furthermore, in an example, images of five persons (i.e., a first subject "A", a second subject "B", a third subject "C", a fourth subject "D" and a fifth subject "E") can be captured in relation to each biometric data feature type.

The training parameters can, in one example, include the first and second biometric data feature types. The training parameters can, in another example, further include the third biometric data feature type. In this regard, the training parameters can, in one example, include five sets (i.e., subjects "A" to "E") of each of the first and second biometric data feature types. The training parameters can, in another example, further include five sets (i.e., subjects "A" to "E") of the third biometric data feature type.

As an example, the processing apparatus 102 can be trained, based on three biometric data feature types, to be a three-type recognizer (i.e., multiple-recognizer). Specifically, the processing apparatus 102 can be trained to be a first type recognizer (e.g., based on head radius of each of subjects "A" to "E"), a second type recognizer (e.g., based on pinna radius of each of subjects "A" to "E") and a third type recognizer (e.g., based on eye separation for each of subjects "A" to "E"). Additionally, in analogous manner as discussed earlier with reference to the multiple-match processing based strategy, one or more of the first to third type recognizers can be configured to identify and retrieve one or more datasets (e.g., HRIRs/HTRFs or BRIRs/BRTFs) from the database(s) 104 given corresponding one or more of new first biometric data feature type, new second biometric data feature type and new third biometric data feature type. The new biometric data feature type(s) can be based on a new subject (i.e., a sixth subject "F").

The present disclosure contemplates that training parameters can be based on other features such as features associated with the datasets. For example, spectral magnitude of a BRIR, spectral notch and peaks of a BRIR can be used as training parameters.

In one example, the processing apparatus 102 can be trained to be a first type recognizer based on BRIR spectral peaks and notches. The processing apparatus 102 can be further trained as a second type recognizer based on BRIR spectral magnitude. The first type recognizer (i.e., based on BRIR spectral peaks and notches) can emphasize certain spatial characteristics such as sensitivity to the elevation of audio source. The second type recognizer (i.e., based on BRIR spectral magnitude) can relate to shape of a person's head.

The present disclosure further contemplates that other than the aforementioned feature type(s), training of the processing apparatus 102 (i.e., so as to be configured as a multiple recognizer) can be by manner of one or more Machine learning methods such as Neural network and statistical Mixture Model.

Each of the datasets retrieved based on the multiple-recognizer based processing strategy can be considered an intermediate processor dataset. In one example, the first to third type recognizers can each be configured to identify and retrieve one or more datasets (i.e., one or more intermediate processor datasets).

In one specific example, the first type recognizer can be configured to identify and retrieve a first BRIR and a second BRIR, the second type recognizer can be configured to identify and retrieve a third BRIR and the third type recognizer can be configured to identify and retrieve a fourth BRIR and a fifth BRIR. The first to fifth BRIRs can be considered to correspond to a first intermediate processor dataset, a second intermediate processor dataset, a third intermediate processor dataset, a fourth intermediate processor dataset and a fifth intermediate processor dataset respectively.

In another specific example, the first type recognizer can be configured to identify and retrieve a first BRIR and a second BRIR, and the third type recognizer can be configured to identify and retrieve a third BRIR. The first to third BRIRs can be considered to correspond to a first intermediate processor dataset, a second intermediate processor dataset and a third intermediate processor dataset respectively.

In yet another specific example, the first type recognizer can be configured to identify and retrieve a first BRIR, the second type recognizer can be configured to identify and retrieve a second BRIR and the third type recognizer can be configured to identify and retrieve a third BRIR. The first to third BRIRs can be considered to correspond to a first intermediate processor dataset, a second intermediate processor dataset and a third intermediate processor dataset respectively.

In this regard, one or more intermediate processor datasets can be generated/derived based on the second processing strategy. The processing apparatus 102 can be configured, as will be discussed later in further detail, to further process the intermediate processor dataset(s) to generate/produce an output signal.

The third processing strategy can, for example, correspond to a cluster based processing strategy.

In regard to the cluster based processing strategy, the present disclosure contemplates that the datasets (e.g., BRIRs) of/from the database(s) 104 can be clustered (i.e., grouped) using methods such as K-means based clustering, Hierarchical Distribution based clustering, Density-based clustering and machine-learning (AI) based clustering (e.g., Support Vector Machine clustering and deep convolutional neural network). Specifically, in an example, one or more datasets can be retrieved from the database(s) 104 and one or more cluster groups can be derived by clustering the retrieved datasets.

In one embodiment, the processing apparatus 102 can be subjected to cluster based training. Specifically, the processing apparatus 102 can be subjected to training by the one or more cluster groups derived. Preferably, datasets that are considered similar (e.g., similar BRIRs) can be grouped to form a cluster.

For example, based on the earlier example of images of five persons (i.e., a first subject "A", a second subject "B", a third subject "C", a fourth subject "D" and a fifth subject "E") being captured in relation to each biometric feature type, a first dataset (i.e., a first BRIR), a second dataset (i.e., a second BRIR), a third dataset (i.e., a third BRIR), a fourth dataset (i.e., a fourth BRIR) and a fifth dataset (i.e., a fifth BRIR) can be obtained. The first and second BRIRs can, for example, be grouped as a first cluster whereas the third, fourth and fifth BRIRs can, for example, be grouped as a second cluster. Moreover, it is appreciable the images of the aforementioned example of five persons can correspond to a first image (i.e., associated with the first dataset), a second image (i.e., associated with the second dataset), a third image (i.e., associated with the third dataset), a fourth image (i.e., associated with the fourth dataset) and a fifth image (i.e., associated with the fifth dataset).

The processing apparatus 102 can be trained by manner of association. For example, the processing apparatus 102 can be trained by manner of associating the first image with the first cluster, associating the second image with the first cluster, associating the third image with the second cluster and associating the fourth image with the second cluster.

Appreciably, the processing apparatus 102 trained by one cluster (i.e., a group of datasets) can correspond to a model. Therefore, when trained by multiple clusters (e.g., a first cluster, a second cluster and a third cluster), the processing apparatus 102 can correspond to multiple models (i.e., a first model based on the first cluster, a second model based on the second cluster and a third model based on the third cluster). Appreciably, a more accurate interpolation can be facilitated since a model's domain space is generally smaller as compared to the entire set of datasets contained in a database 104. Interpolation can, for example, be either in frequency domain or time-domain.

In one embodiment, the processing apparatus 102 can be configured to derive one or more datasets (e.g., BRIR/BRTF or HRIR/HRTF) from the database(s) 104 based one or more of the aforementioned multiple models. In another embodiment, the processing apparatus 102 can be configured to characterize each model (i.e., from the aforementioned multiple models) to derive/generate a response characteristic.

According to an embodiment of the disclosure, each of the datasets retrieved based on the cluster based processing strategy can be considered an intermediate processor dataset. In one example, based on one or more of the aforementioned multiple models (e.g., first to third models), the processing apparatus 102 can be configured to identify and retrieve one or more corresponding datasets (e.g., one or more BRIRs).

In one specific example, based on the first model, the processing apparatus 102 can be configured to identify and retrieve a first BRIR and a second BRIR. Based on the second model, the processing apparatus 102 can be configured to identify and retrieve a third BRIR. Based on the third model, the processing apparatus 102 can be configured to identify and retrieve a fourth BRIR and a fifth BRIR. The first to fifth BRIRs can be considered to correspond to a first intermediate processor dataset, a second intermediate processor dataset, a third intermediate processor dataset, a fourth intermediate processor dataset and a fifth intermediate processor dataset respectively.

In another specific example, based on the first model, the processing apparatus 102 can be configured to identify and retrieve a first BRIR and a second BRIR. Based on the second model, the processing apparatus 102 can be configured to identify and retrieve a third BRIR. The first to third BRIRs can be considered to correspond to a first intermediate processor dataset, a second intermediate processor dataset and a third intermediate processor dataset respectively.

In yet another specific example, based on the first model, the processing apparatus 102 can be configured to identify and retrieve a first BRIR. Based on the second model, the processing apparatus 102 can be configured to identify and retrieve a second BRIR. Based on the third model, the processing apparatus 102 can be configured to identify and retrieve a third BRIR. The first to third BRIRs can be considered to correspond to a first intermediate processor dataset, a second intermediate processor dataset and a third intermediate processor dataset respectively.

Earlier mentioned, the processing apparatus 102, in another embodiment, can be configured to characterize each model (i.e., from the aforementioned multiple models) to derive/generate a response characteristic. In one example, based on one or more of the aforementioned multiple models (e.g., first to third models), the processing apparatus 102 can be configured to derive/generate one or more corresponding response characteristics.

According to another embodiment of the disclosure, each of the response characteristics derived/generated based on the cluster based processing strategy can be considered an intermediate processor dataset. In one example, based on one or more of the aforementioned multiple models (e.g., first to third models), the processing apparatus 102 can be configured to derive/generate one or more corresponding response characteristics (e.g., a first response characteristic, a second response characteristic and a third response characteristic). The derived/generated response characteristic(s) can correspond to derived/generated intermediate processor dataset(s) (e.g., a first intermediate processor dataset, a second intermediate processor dataset and a third intermediate processor dataset). For example, the first to third response characteristics can correspond, respectively, to a first to third intermediate processor datasets.

The present disclosure contemplates that the processing apparatus 102 can be configured to characterize the model(s) by manner of one or both of static cluster characterization and dynamic cluster characterization. Moreover, each cluster can be associated with a centroid and a plurality of datasets (e.g., BRIRs/BRTFs or HRIRs/HRTFs).

In regard to static cluster characterization, datasets (e.g., BRIRs) and/or the centroid of a cluster can be considered. In one example, an average of the BRIRs in a cluster can be obtained to derive/generate a response characteristic. In another example, BRIR which is considered to be the nearest to the centroid can be identified to derive/generate a response characteristic. In yet another example, a weighted sum of all the BRIRs (where BRIRs closer to the centroid are weighted higher compared to those further from the centroid) can be obtained to derive/generate a response characteristic. In yet a further example, the datasets can be considered based on general statistical methods (e.g., a median based statistical method).

Appreciably, in this regard, based on static cluster characterization, each model can be associated with a response characteristic (e.g., in the form of a BRIR). For example, a first model can be associated with a first response characteristic (e.g., in the form of a first BRIR), a second model can be associated with a second response characteristic (e.g., in the form of a second BRIR) and a third model can be associated with a third response characteristic (e.g., in the form of a third BRIR).

In regard to dynamic cluster characterization, datasets and/or centroid of a cluster can be considered in combination with a new image captured (e.g., a sixth image in relation to a new sixth subject "F" in the context of the earlier example of five images in relation to a first subject "A", a second subject "B", a third subject "C", a fourth subject "D" and a fifth subject "E").

A dataset (e.g., BRIR) associated with a newly captured image (e.g., image of a new sixth subject "F") can be identified and retrieved (i.e., in analogous manner as discussed earlier) from the database(s) 104. Moreover, the newly captured image (i.e., the sixth image) can be compared with, for example, the first to fifth images. For example, biometric data associated with the sixth image can be compared with biometric data associated with corresponding biometric data associated with the first to fifth images. By manner of determining similarity/closeness between the sixth image and any one of, or any combination of, the first to fifth images, weight/contribution associated with the dataset associated with the sixth image can be determined.

Based on the weight/contribution of the dataset associated with the sixth image, a response characteristic can be determined in analogous manner as discussed earlier in respect of static cluster characterization.

For example, earlier mentioned in the context of static cluster characterization, the centroid can be used as a reference for determining a weighted sum of all the BRIRs (where BRIRs closer to the centroid are weighted higher compared to those further from the centroid) so as to derive/generate a response characteristic. In the case of dynamic cluster characterization, instead of the centroid, the weight/contribution of the dataset associated with the newly captured image (e.g., sixth image) can be used as reference.

In this regard, one or more intermediate processor datasets can be generated/derived based on the third processing strategy. The processing apparatus 102 can be configured, as will be discussed later in further detail, to further process the intermediate processor dataset(s) to generate/produce an output signal.

Based on the foregoing concerning the processing strategies, it is appreciable that a plurality of intermediate processor datasets can be derived/produced based on any one of the processing strategies or any combination of the processing strategies to produce at least one output signal.

Earlier mentioned, output signal(s) can correspond to output data in the form of, for example, a customized audio response characteristic (e.g., audio related transfer function). These will be discussed in further detail, based on an exemplary context 300, with reference to FIG. 3 hereinafter.

Figure 3:
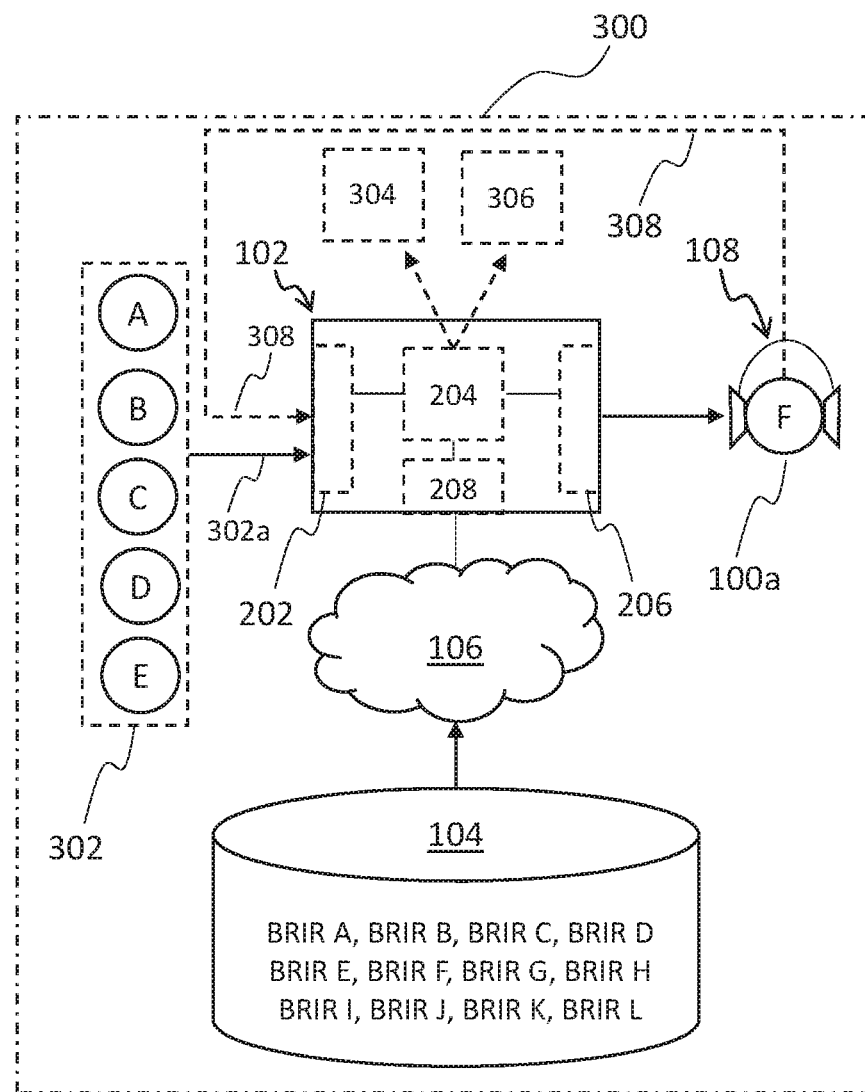
FIG. 3 shows an exemplary context in relation to the processing apparatus of FIG. 2 being configured to generate at least one output signal, according to an embodiment of the disclosure.

Referring to FIG. 3, an exemplary context 300 in relation to the processing apparatus 102 being configured to generate at least one output signal is shown, according to an embodiment of the disclosure.

Specifically in the exemplary context 300, the database 104 can be a BRIR based database which contains a plurality of BRIRs (i.e., BRIR A to BRIR L as shown in FIG. 3).

Moreover, the processing apparatus 102 can be configured based on a combination of the earlier discussed processing strategies. For example, the processing apparatus 102 can be configured by manner of training based on a combination of the earlier discussed second and third processing strategies to derive/produce a plurality of intermediate processor datasets, and combining the intermediate processor datasets based on the first processing strategy.

Additionally, a plurality of subjects 302 can be considered for the purpose of training the processing apparatus 102. For example, at least five subjects (i.e., subject "A" to subject "E") can be considered for the purpose of training the processing apparatus 102. Furthermore, the biometric data can relate to one or both of a first biometric data feature type such as pinna radius of each of the five subjects and a second biometric data feature type such as head radius of each of the five subjects.

More specifically, as indicated by arrow 302a, the processing apparatus 102 can be configured to one or both of capture data (i.e., capture image of each of the five subjects) and receive captured data (i.e., captured image of each of the five subjects) corresponding to a first image (i.e., of subject "A"), a second image (i.e., of subject "B"), a third image (i.e., of subject "C"), a fourth image (i.e., of subject "D") and a fifth image (i.e., of subject "E").

The first to fifth images can each be associated with a BRIR from the BRIR database 104. Specifically, the first image can be associated with a first BRIR (i.e., BRIR "A"). The second image can be associated with a second BRIR (i.e., BRIR "B"). The third image can be associated with a third BRIR (i.e., BRIR "C"). The fourth image can be associated with a fourth BRIR (i.e., BRIR "D"). The fifth image can be associated with a fifth BRIR (i.e., BRIR "E").

Furthermore, the processing apparatus 102 can be configured to extract biometric data from each of the first to fifth images. As mentioned, the extracted biometric data can include one or both of pinna radius and head radius. In this regard, the processing apparatus 102 can be configured to determine pinna radius and/or head radius of each subject (i.e., subjects "A" to "E").

In one embodiment, the first to fifth BRIR can be further processed by the processing apparatus 102 by manner of clustering. Clustering can be based on the extracted biometric data such as head radius. For example, the first to fifth BRIR can be subjected to K-means based clustering based on head radius of each of the subjects (i.e., subject "A" to subject "E") to derive a first cluster and a second cluster. Specifically, the first cluster can, for example, include the first BRIR (i.e., BRIR "A"), the second BRIR (i.e., BRIR "B") and the fifth BRIR (i.e., BRIR "E"). The second cluster can, for example, include the third BRIR (i.e., BRIR "C") and the fourth BRIR (i.e., BRIR "D").

Moreover, the processing apparatus 102 can be trained via a plurality of training options. The plurality of training options can include, for example, a first training option and a second training option.

The first training option can, for example, relate to training the processing apparatus 102 to be a first type recognizer based on the first biometric data feature type (e.g., pinna radius). Specifically, pinna radius extracted based on the first image (i.e., of subject "A") can be associated with the first BRIR (i.e., BRIR "A"), the pinna radius extracted based on the second image (i.e., of subject "B") can be associated with the second BRIR (i.e., BRIR "B"), the pinna radius extracted based on the third image (i.e., of subject "C") can be associated with the third BRIR (i.e., BRIR "C"), the pinna radius extracted based on the fourth image (i.e., of subject "D") can be associated with the fourth BRIR (i.e., BRIR "D") and the pinna radius extracted based on the fifth image (i.e., of subject "E") can be associated with the fifth BRIR (i.e., BRIR "E").

The processing apparatus 102 can be configured to store each of the above mentioned association between pinna radius and BRIR in the form of a reference table 304 (i.e., a table of reference data based on association between a biometric data feature type and a dataset). The reference table 304 can be stored in, for example, a memory portion (not shown) of the processing apparatus 102. The reference table 304 can be a basis for generating one or more intermediate processor datasets as will be discussed later in further detail.

The second training option can, for example, relate to training the processing apparatus 102 to be a second type recognizer based on the second biometric data feature type (e.g., head radius). Moreover, the second training option can be by manner of clustering based on the second biometric data feature type to derive one or more clusters 306 (e.g., a first cluster and/or a second cluster).

In an earlier example, head radius of each of the subjects (i.e., subject "A" to subject "E") can be subjected to clustering to derive a first cluster and a second cluster. The first cluster can, for example, include the first BRIR (i.e., BRIR "A"), the second BRIR (i.e., BRIR "B") and the fifth BRIR (i.e., BRIR "E"). The second cluster can, for example, include the third BRIR (i.e., BRIR "C") and the fourth BRIR (i.e., BRIR "D").

Moreover, the BRIRs of each of the first and second clusters can be subjected to averaging (i.e., the processing apparatus 102 can be configured to further process the clusters by manner of averaging) to derive/produce an intermediate processor dataset (e.g., a BRIR). Specifically, the first cluster can be further processed to derive/generate an intermediate processor dataset (e.g., a BRIR) and the second cluster can be further processed to derive/generate another intermediate processor dataset (e.g., another BRIR).

The cluster(s) 306 can, in one embodiment, be used for training the processing apparatus 102. For example, the first and second clusters can be used for training the processing apparatus 102.

Specifically, the processing apparatus 102 can, for example, be trained based on the first and second clusters by manner of association between head radius (i.e., of a subject) and a cluster (i.e., the first cluster/the second cluster).

For example, head radius extracted based on the first image (i.e., of subject "A") can be associated with the first cluster, the head radius extracted based on the second image (i.e., of subject "B") can be associated with the first cluster, the head radius extracted based on the third image (i.e., of subject "C") can be associated with the second cluster, the head radius extracted based on the fourth image (i.e., of subject "D") can be associated with the second cluster and the head radius extracted based on the fifth image (i.e., of subject "E") can be associated with the first cluster.

Association between the cluster(s) 306 and the second biometric data feature type (e.g., head radius) can be stored in a memory portion (not shown) of the processing apparatus 102 in the form of a reference look-up analogous to the aforementioned reference table 304.

The processing apparatus 102 trained based on the second training option can be configured to generate one or more intermediate processor datasets as will be discussed later in further detail.

Earlier mentioned, the processing apparatus 102 can be configured by manner of training based on a combination of the earlier discussed second and third processing strategies to derive/produce a plurality of intermediate processor datasets.

Appreciably, the processing apparatus 102 can be configured based on a combination of the first and second training options. Further appreciably, the first training option can be considered to be based on the second processing strategy whereas the second training option can be considered to be based on a combination of the second processing strategy and the third processing strategy. In this manner, the processing apparatus 102 can be configured by manner of training based on a combination of the second and third processing strategies according to an embodiment of the disclosure.

Additionally it was mentioned earlier, the reference table 304 (i.e., in relation to the first training option) can be a basis for generating one or more intermediate processor datasets and the processing apparatus 102 trained based on the second training option can be configured to generate one or more intermediate processor datasets.

The processor apparatus 102 (which has been trained based on a combination of the first and second training options, according to an embodiment of the disclosure) can be configured to combine the intermediate processor datasets based on the first processing strategy to generate/produce at least one output signal. This will be discussed in the context of an output signal being generated in relation to a new subject "F" corresponding to the aforementioned person 100a mentioned in FIG. 1.

Captured data associated with the new subject "F" (i.e., person 100a) can be obtained (as indicated by dotted arrow 308). Specifically, biometric data of the new subject "F" can be obtained and the obtained biometric data can include a first biometric feature type (e.g., pinna radius) and a second biometric feature type (e.g., head radius).

The processing apparatus 102 can be configured to generate/produce a first set of intermediate processor dataset based on a first processing mode. Moreover, the processing apparatus 102 can be configured to generate/produce a second set of intermediate processor dataset based in a second processing mode.

Each of the first set and second set of intermediate processor dataset can include one or more intermediate processor datasets (e.g., one or more BRIRs). Moreover, the first processing mode can be based on the processing apparatus 102 operating as the aforementioned first type recognizer and the second processing mode can be based on the processing apparatus 102 operating as the aforementioned second type recognizer.

In the first processing mode, the biometric data of the new subject "F" can be further processed by the processing apparatus 102 by manner of data comparison. More specifically, the first biometric feature type (e.g., pinna radius) associated with the new subject "F" can be obtained and compared against/with the reference table 304 to determine/retrieve one or more BRIRs which can be considered to most closely match the, for example, pinna radius of the new subject "F".

In one example, data comparison can be based on a closest match based comparison with a predetermined tolerance. Specifically, the predetermined tolerance can be based on a difference of 1 cm. More specifically, a BRIR associated with a pinna radius in the reference table 304 which is less than 1 cm in difference to the pinna radius of the new subject "F" can be retrieved.

In a more specific example, based on comparison between the pinna radiuses of the new subject "F" and the subjects (i.e., subjects "A" to "E") recorded/stored in the reference table 304. A plurality of BRIRs (e.g., a BRIR associated with the pinna radius of subject "A", a BRIR associated with the pinna radius of subject "C" and a BRIR associated with the pinna radius of the subject "E") can be retrieved. The closest match (e.g., BRIR associated with the pinna radius of subject "E") can have a confidence level of 0.9 (with a confidence level of 1.0 being considered as the perfect match), the next closest match (e.g., BRIR associated with the pinna radius of subject "A") can have a confidence level of 0.8 and the subsequent closest match (e.g., BRIR associated with the pinna radius of subject "C") can have a confidence level of 0.6, and so on.

In this regard, the first set of intermediate processor dataset can, for example, include a first BRIR (e.g., BRIR I) associated with a confidence level of 0.9, a second BRIR (e.g., BRIR II) associated with a confidence level of 0.8 and a third BRIR (BRIR III) associated with a confidence level of 0.6.

In the second processing mode, the biometric data of the new subject "F" can be further processed by the processing apparatus 102 by manner of data comparison. More specifically, the second biometric feature type (e.g., head radius) associated with the new subject "F" can be obtained and compared against/with the aforementioned look-up reference to retrieve one or more cluster(s) 306. Each cluster 306 retrieved can be associated with a confidence level.

For example, the aforementioned first cluster and the aforementioned second cluster can be retrieved based on head radius of the new subject "F". The first cluster can be considered to be most closely matching and the second cluster to a much lesser extent. In this regard, the first cluster can be associated with a confidence level close to 1.0 (e.g., 0.9) whereas the second cluster can be associated with a confidence level which is further from 1.0 (e.g., 0.5).

Moreover, as mentioned earlier, the BRIRs of each of the first and second clusters can be subjected to averaging to derive/produce an intermediate processor dataset (e.g., a BRIR). Specifically, the first cluster can be further processed to derive/generate an intermediate processor dataset (e.g., a BRIR) and the second cluster can be further processed to derive/generate another intermediate processor dataset (e.g., another BRIR). The BRIR derived based on the first cluster can correspond to, for example, a first clustered BRIR. The BRIR derived based on the second cluster can correspond to, for example, a second clustered BRIR.

In this regard, the second set of intermediate processor dataset can, for example, include a first clustered BRIR associated with a confidence level of 0.9 and a second clustered BRIR associated with a confidence level of 0.5.

Earlier mentioned, the processor apparatus 102 can be configured to combine the intermediate processor datasets based on the first processing strategy.

Specifically, the first and second sets of intermediate processor dataset can be combined based on the first processing strategy.

In one embodiment, the first and second sets of intermediate processor dataset can be combined based on weighted sum to obtain an output signal.

More specifically, based on weighted sum, the output signal can, for example, be:

Output signal=0.9*BRIR I+0.8*BRIR II+0.6*BRIR III+0.9*first clustered BRIR+0.5*second clustered BRIR In another embodiment, the first and second sets of intermediate processor dataset can be combined based on weighted sum and the weighted sum is further subjected to a scale factor (i.e., "N") to obtain an output signal. For example, Output signal=(0.9*BRIR I+0.8*BRIR II+0.6*BRIR III+0.9*first clustered BRIR+0.5*second clustered BRIR)*N (e.g., N=⅕, given that there are 5 BRIRs in the weighted sum).

Figure 4:
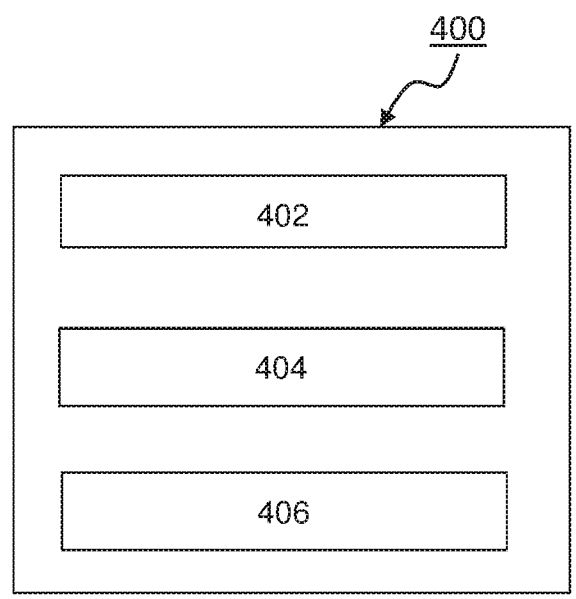
FIG. 4 shows a processing method in association with the system of FIG. 1, according to an embodiment of the disclosure.

FIG. 4 shows a processing method 400 in association with the system 100 of FIG. 1, according to an embodiment of the disclosure.

The processing method 400 can include an extraction step 402, a generating step 404 and an output step 406.

At the extraction step 402, at least one image (e.g., a photograph) of a subject (e.g., the aforementioned person 100a/subject "F") can be captured. The captured image can, for example, correspond to an image of the head of the subject, an image of the upper torso of the subject or an image of an ear of the subject. The captured image(s) can be received and processed at the processing apparatus 102 to generate at least one input signal.

The input signal(s) can correspond to biometric data associated with the subject. Biometric data can be extracted (e.g., by the processing apparatus 102) from the captured image(s). In one embodiment, the biometric data can include a first biometric feature type (e.g., pinna radius) and a second biometric feature type (e.g., head radius).

At the generating step 404, the generated input signal(s) can be further processed by the processing apparatus 102 based on at least one database signal. The database signal(s) can be communicated from at least one database 104 to the processing apparatus 102. Specifically, the generated input signal(s) can be further processed based on the database signal(s) to generate a plurality of intermediate processor datasets.

In one embodiment, the processing apparatus 102 can be trained to operate as at least one type of recognizer (e.g., a first type recognizer or a second type recognizer) of a plurality of recognizers. In another embodiment, the processing apparatus is capable of being trained to operate as a multi-recognizer (i.e., a plurality of recognizers) corresponding to at least a first type recognizer and a second type recognizer.

Earlier mentioned, the processing apparatus 102 can be operated as the first type recognizer in a manner so as to generate a first set of intermediate processor dataset based on the first biometric feature type (e.g., pinna radius). Additionally, the processing apparatus 102 can be operated as the second type recognizer to generate a second set of intermediate processor dataset based on the second biometric feature type (e.g., head radius).

At the output step 406, the intermediate processor datasets can be combined. Specifically, the processing apparatus 102 can be configured to combine the intermediate processor datasets in a manner so as to produce at least one output signal.

In one embodiment, the intermediate processor datasets can include the aforementioned first set of intermediate processor dataset and the aforementioned second set of intermediate processor dataset. Each of the first and second sets of intermediate processor dataset can include one or more intermediate processor datasets. The first and second sets of intermediate processor dataset can be combined by the processing apparatus 102 by manner of weighted sum.

In another embodiment, the database(s) 104 can include a plurality of datasets. The plurality of datasets can be communicated in the form of corresponding plurality of database signals from the database(s) 104 to the processing apparatus 102. Earlier mentioned, the plurality of datasets of the database(s) 104 can be grouped into a plurality of cluster groups (i.e., corresponding to the aforementioned clusters 306). Each cluster group can correspond to a cluster (e.g., the aforementioned first cluster or the aforementioned second cluster) which can include at least one dataset.

Additionally, the processing apparatus 102 can be trained by manner of association in which a biometric feature type (e.g., head radius) retrieved from one or more captured images (e.g., from subjects "A" to "E") can be associated with a cluster (e.g., the aforementioned first cluster or the aforementioned second cluster).

In this regard, the processing apparatus 102 can, in one embodiment, be trained to operate as a multi-recognizer (e.g., a first type recognizer and a second type recognizer) in which one of the recognizers (e.g., the first type recognizer) can generate a first set of intermediate processor dataset based on the first biometric feature type (e.g., pinna radius) and another one of the recognizers (e.g., the second type recognizer) can generate a second set of intermediate processor dataset based on the second biometric feature type (e.g., head radius) which is associated with a cluster (e.g., the first cluster/the second cluster).

Earlier mentioned, the first and second sets of intermediate processor dataset can be combined by the processing apparatus 102 by manner of weighted sum.

Appreciably, the output signal(s) can correspond to at least one audio response characteristic unique to the subject. Moreover, the output signal(s) can be applied to input audio signals (e.g., at the audio device 108 worn by the subject) to generate output audio signals audibly perceivable by the subject so as to provide the subject with customized audio experience.

More specifically, as mentioned earlier, in one embodiment, the audio device 108 can include an audio source (not shown), an audio processor (not shown) and a pair of speaker drivers (not shown). The audio source can be coupled to the audio processor. The audio processor can be coupled to the pair of speaker drivers.

In this regard, the audio processor can be configured based on the output signal(s). Input audio signals generated and communicated from the audio source to the audio processor can be processed by the audio processor based on the output signal(s) to generate/produce output audio signals. Generated output audio signals can be communicated from the audio processor to the pair of speaker drivers. The subject, wearing the audio device 108, can audibly perceive the output audio signals via the pair of speaker drivers.

It should be further appreciated by the person skilled in the art that variations and combinations of features described above, not being alternatives or substitutes, may be combined to form yet further embodiments.

In the foregoing manner, various embodiments of the disclosure are described for addressing at least one of the foregoing disadvantages. Such embodiments are intended to be encompassed by the following claims, and are not to be limited to specific forms or arrangements of parts so described and it will be apparent to one skilled in the art in view of this disclosure that numerous changes and/or modification can be made, which are also intended to be encompassed by the following claims.

In one example, the aforementioned clusters 306 can be further processed by the processing apparatus 102 to derive a cluster pyramid have a top level and a plurality of lower levels (e.g., a first lower level following the top level and, optionally, a second lower level following the first lower level).

The top level may be associated with a feature which can be a form of preliminary partition of domain space. For example, spectral magnitude can be a feature for preliminary matching so as to select a cluster out of, for example, four clusters at the top level.

Based on the selected cluster, a different feature (e.g. spectral peak/notch) can be used for secondary matching at the first lower level. For example, the selected cluster can be subjected to further matching (i.e., within the selected cluster based on spectral peak/notch) to produce/generate a refined cluster. The refined cluster may be subjected to yet further matching (in analogous manner per the first lower level) based on yet another feature at the second lower level to produce/generate a yet further refined cluster.

The invention claimed is:

1. A processing method of a processing apparatus, comprising:
    processing at least one captured image of a subject to generate at least one image-related input signal;
    processing the at least one image-related input signal based on at least one database signal, which is communicable from at least one database to the processing apparatus, to generate a plurality of intermediate processor datasets, wherein the at least one database comprises a plurality of datasets communicable as corresponding plurality of database signals to the processing apparatus;
    grouping the plurality of datasets into a plurality of cluster groups, each cluster group corresponding to a cluster comprising at least one dataset; and
    combining the plurality of intermediate processor datasets to produce at least one output signal,
    wherein the processing apparatus is configured to associate a biometric feature type retrieved from a captured image with the corresponding cluster in generating the plurality of intermediate processor datasets,
    wherein the at least one output signal corresponds to an audio response characteristic unique to the subject, and
    wherein the at least one output signal is capable of being applied to input audio signals to generate output audio signals audibly perceivable by the subject so as to provide the subject with customized audio experience.

2. The processing method as in claim 1, wherein the processing apparatus is capable of being trained to operate as at least one type of recognizer of a plurality of recognizers.

3. The processing method as in claim 1, wherein the processing apparatus is capable of being trained to operate as a multi-recognizer corresponding to at least a first type recognizer and a second type recognizer.

4. The processing method as in claim 3,
wherein the at least one image-related input signal corresponds to biometric data associated with the subject, and
wherein the biometric data comprises a first biometric feature type and a second biometric feature type.

5. The processing method as in claim 4,
wherein the processing apparatus is operable as the first type recognizer to generate a first set of intermediate processor datasets based on the first biometric feature type, and
wherein the processing apparatus is operable as the second type recognizer to generate a second set of intermediate processor datasets based on the second biometric feature type.

6. The processing method as in claim 5,
wherein the first and second sets of intermediate processor datasets are combined by the processing apparatus using weighted sums.

7. The processing method as in claim 1,
wherein the processing apparatus is operable as a multi-recognizer corresponding to at least a first type recognizer and a second type recognizer.

8. The processing method as in claim 7,
wherein the at least one image-related input signal corresponds to biometric data associated with the subject,
wherein the biometric data comprises a first biometric feature type and a second biometric feature type,
wherein the second biometric feature type is the biometric feature type associated with the corresponding cluster by the processing apparatus,
wherein the processing apparatus is operable as the first type recognizer to generate a first set of intermediate processor datasets based on the first biometric feature type, and
wherein the processing apparatus is operable as the second type recognizer to generate a second set of intermediate processor datasets based on the second biometric feature type.

9. The processing method as in claim 8,
wherein the first and second sets of intermediate processor datasets are combined by the processing apparatus using weighted sums.

10. The processing method as in claim 1,
wherein the audio response characteristic is unique to the subject under a given environment and is one of an HRIR or BRIR.

11. The processing method as in claim 1,
wherein processing the at least one image-related input signal based on the at least one database signal to generate the plurality of intermediate processor datasets comprises implementing either a multiple-match processing based strategy, a multiple-recognizer based processing strategy, a cluster based processing strategy, or any combination thereof.

12. A processing apparatus configurable to be communicable with at least one database containing at least one dataset corresponding to an audio response characteristic based on biometric data from at least one person, the at least one dataset from the at least one database being communicable as corresponding at least one database signal to the processing apparatus,
wherein the processing apparatus is operable in at least one processing mode of a plurality of processing modes, each processing mode corresponding to a recognizer type,
wherein the processing apparatus is configurable to receive an image of a subject and generate at least one image-related input signal based on the received image,
wherein the processing apparatus is configurable to process the at least one image-related input signal based on the at least one database signal to generate a plurality of intermediate processor datasets and to combine the plurality of intermediate processor datasets to generate at least one output signal, the at least one output signal corresponding to an audio response characteristic unique to the subject,
wherein the processing apparatus is configurable to group a plurality of datasets into a plurality of cluster groups, each cluster group corresponding to a cluster comprising at least one dataset,
wherein the processing apparatus is configured to associate a biometric feature type retrieved from a captured image with the corresponding cluster in generating the plurality of intermediate processor datasets, and
wherein the at least one output signal is capable of being applied to input audio signals to generate output audio signals audibly perceivable by the subject so as to provide the subject with customized audio experience.

13. The processing apparatus as in claim 12,
wherein the plurality of intermediate processor datasets is generated based on biometric feature types.

14. The processing apparatus as in claim 13,
wherein the plurality of intermediate processor datasets is combined by using weighted sums.

15. The processing apparatus as in claim 12,
wherein the at least one database comprises a plurality of datasets communicable as corresponding plurality of database signals to the processing apparatus,
wherein the plurality of datasets are grouped into a plurality of cluster groups, each cluster group corresponding to a cluster comprising at least one dataset, and
wherein the processing apparatus is configured to associate a biometric feature type retrieved from a captured image with the corresponding cluster.

16. The processing apparatus as in claim 12,
wherein the processing apparatus is configured to process the at least one image-related input signal based on the at least one database signal to generate the plurality of intermediate processor datasets by implementing either a multiple-match processing based strategy, a multiple-recognizer based processing strategy, a cluster based processing strategy, or any combination thereof.

17. A system, comprising:
at least one database containing at least one dataset corresponding to an audio response characteristic based on biometric data from at least one person; and
a processing apparatus configured to communicate with the at least one database, the at least one dataset from the database being communicable as corresponding at least one database signal to the processing apparatus,
wherein the processing apparatus is operable in at least one processing mode of a plurality of processing modes, each processing mode corresponding to a recognizer type,
wherein the processing apparatus is configurable to receive an image of a subject and generate at least one image-related input signal based on the received image,
wherein the processing apparatus is configurable to process the at least one image-related input signal based on the at least one database signal to generate a plurality of intermediate processor datasets and to combine the plurality of intermediate processor datasets to generate at least one output signal, the at least one output signal corresponding to an audio response characteristic unique to the subject, wherein the processing apparatus is configurable to group a plurality of datasets into a plurality of cluster groups, each cluster group corresponding to a cluster comprising at least one dataset, wherein the processing apparatus is configured to associate a biometric feature type retrieved from a captured image with the corresponding cluster in generating the plurality of intermediate processor datasets, and wherein the at least one output signal is capable of being applied to input audio signals to generate output audio signals audibly perceivable by the subject so as to provide the subject with customized audio experience.

18. The system as in claim 17, further comprising:
a communication network for coupling the at least one database to the processing apparatus, wherein the at least one database is carried by at least one server external to the processing apparatus.

19. The system as in claim 18,
wherein the plurality of intermediate processor datasets is selected from the group consisting of: BRIR, BRTF, HRIR, and HRTF datasets.

20. The system as in claim 19,
wherein the plurality of intermediate processor datasets corresponds to the biometric data for at least two different biometric feature types.

\* \* \* \* \*